United States Patent
Kaur (10) Patent No.: US 10,049,561 B2
(45) Date of Patent: Aug. 14, 2018

(54) DISTRESS SIGNAL DEVICE

(71) Applicant: ENT. SERVICES DEVELOPMENT CORPORATION LP, Houston, TX (US)

(72) Inventor: Satwant Kaur, Mountain View, CA (US)

(73) Assignee: ENT. SERVICES DEVELOPMENT CORPORATION LP, Houston, TX (US)

( * ) Notice: Subject to any disclaimer, the term of this patent is extended or adjusted under 35 U.S.C. 154(b) by 0 days.

(21) Appl. No.: 15/510,625

(22) PCT Filed: Nov. 25, 2014

(86) PCT No.: PCT/US2014/067381
§ 371 (c)(1),
(2) Date: Mar. 10, 2017

(87) PCT Pub. No.: WO2016/085474
PCT Pub. Date: Jun. 2, 2016

(65) Prior Publication Data
US 2017/0287315 A1    Oct. 5, 2017

(51) Int. Cl.
G08G 1/08    (2006.01)
G08B 25/10    (2006.01)
H04W 4/02    (2018.01)
H04W 4/22    (2009.01)
H04W 4/20    (2018.01)
H04W 4/90    (2018.01)

(52) U.S. Cl.
CPC ............. *G08B 25/10* (2013.01); *H04W 4/02* (2013.01); *H04W 4/20* (2013.01); *H04W 4/22* (2013.01); *H04W 4/90* (2018.02)

(58) Field of Classification Search
CPC .......... G08B 25/10; H04W 4/02; H04W 4/20; H04W 4/22
USPC ..................................... 340/539.13
See application file for complete search history.

(56) References Cited

U.S. PATENT DOCUMENTS

| 8,021,841 B1 * | 9/2011 | Schatz | B82Y 30/00 435/6.1 |
| 8,665,479 B2 | 3/2014 | Tan et al. | |
| 8,795,172 B2 | 8/2014 | Abolfathi et al. | |

(Continued)

FOREIGN PATENT DOCUMENTS

| KR | 20110012620 | 2/2011 |
| KR | 20140000860 | 5/2014 |

OTHER PUBLICATIONS

Intel Free Press ~ "Tech Interns Create Smart Bike Helmet That Could Save Your Life" — Aug. 29, 2014 ~ Intel Corporation ~ 3 pages.

(Continued)

*Primary Examiner* — John A Tweel, Jr.
(74) *Attorney, Agent, or Firm* — Sheppard Mullin Richter & Hampton LLP (57) ABSTRACT

Example implementations relate to a fiber-shaped device for transmitting a distress signal to a remote computer. The fiber-shaped device includes a sensor, an analysis module that determines if a sensor signal from the sensor includes a trigger signal, and a wireless communication module to transmit a distress signal to a remote computer when the sensor signal includes the trigger signal.

15 Claims, 8 Drawing Sheets

(56) References Cited

U.S. PATENT DOCUMENTS

| | | |
|---|---|---|
| 2012/0052836 A1 | 3/2012 | Buratti et al. |
| 2012/0086570 A1 | 4/2012 | Gancarcik et al. |
| 2014/0070957 A1 | 3/2014 | Longinotti-Buitoni et al. |
| 2014/0268604 A1 | 9/2014 | Wicker et al. |
| 2014/0278388 A1 | 9/2014 | Watson et al. |

OTHER PUBLICATIONS

Lopez et al ~ "3D printed miniaturized UWB antenna for wireless body area network" ~ EuCAP 2014 ~ pp. 3090-3093 (abstract), Apr. 6-11, 2014.
Najafi ~ "Biomimetic Hair Sensors: Utilizing the Third Dimension" ~ University of Michigan WIMS2 ~ Sep. 2012 ~ 4 pages.
NASA ~ Roundup ~ Summer 2014 ~ pp. 12, Jun. 25, 2014.
Office of Technology Management, Urbana-Champaign University of Illinois ~ "Flexible Sensory Skin" ~ Oct. 2014 ~ 3 pages.
Ryals ~ :Message in a Bracelet~ NC Mete News ~ Jun. 4, 2014 ~ 4 pages.
Tentzeris ~ "Inkjet-printed paper/polymer-based "green" RFID and wireless sensor nodes: The final step to bridge cognitive intelligence, nanotechnology and RF?" ~ ICWITS ~ 2010 2 pages.
Tia Ghose, "Artificial Heart", Mar. 3, 2014 http://www.livescience.com/43810-3d-printed-heart-layer.html.
University of Warwick ~ "Printing electronic sensors using low-cost 3D printers" ~Nov. 22, 2012 ~ 9 pages.
International Search Report and Written Opinion dated Jul. 29, 2015, PCT Patent Application No. PCT/US2014/067381, filed Nov. 25, 2014, Korean Intellectual Property Office.

\* cited by examiner

DISTRESS SIGNAL DEVICE

CLAIM FOR PRIORITY

The present application is a national stage filing under 35 U.S.C. § 371 of PCT application number PCT/US2014/067381, having an international filing date of Nov. 25, 2014, the disclosure of which is hereby incorporated by reference in its entirety.

BACKGROUND

Generally, a person in need of emergency assistance can call an emergency telephone number to contact an emergency dispatch center that will ascertain the nature of the emergency and dispatch the appropriate emergency responder(s) to the caller's location. Emergencies typically require urgent attention, and outcomes can depend on how quickly assistance is requested and rendered.

BRIEF DESCRIPTION OF THE DRAWINGS

Various examples will be described below with reference to the following figures. Different ones of the figures may have at least some reference numerals that are the same in order to identify similar, though perhaps not identical, components. For the sake of brevity, a detailed description of each such component having a previously described function may not be provided below with respect to other figures in which they appear.

DETAILED DESCRIPTION

Emergencies are situations that pose an imminent risk to life, health, and property and require urgent attention and intervention, typically by trained emergency responders, such as police officers, firefighters, and emergency medical services. Positive outcomes generally depend on factors such as expediently notifying authorities of the emergency, fast response times by the emergency responders, and adequately briefing the emergency responders regarding the emergency situation (e.g., the type of emergency, the parties involved, and the location of the emergency).

Generally, a person in distress (that is, a person in need of emergency assistance) can call an emergency telephone number (e.g., 9-1-1 in the United States) to contact an emergency dispatch center that will ascertain the nature of the emergency and dispatch the appropriate emergency responder(s) to the caller's location. However, in certain emergency situations, a person in need of emergency assistance may not be able to access a phone to request emergency assistance, which may lead to an untimely response by emergency responders. For example, a person may be unable to reach or use a phone after an accident due to bodily incapacitation or damage to the phone. In other cases, a person may be unable to safely reach or use a phone due to the presence of an intruder.

Accordingly, a discreet and readily accessible emergency notification device may be useful to improve emergency responder response time and preparedness, which in turn may help improve emergency outcomes.

Figure 1:
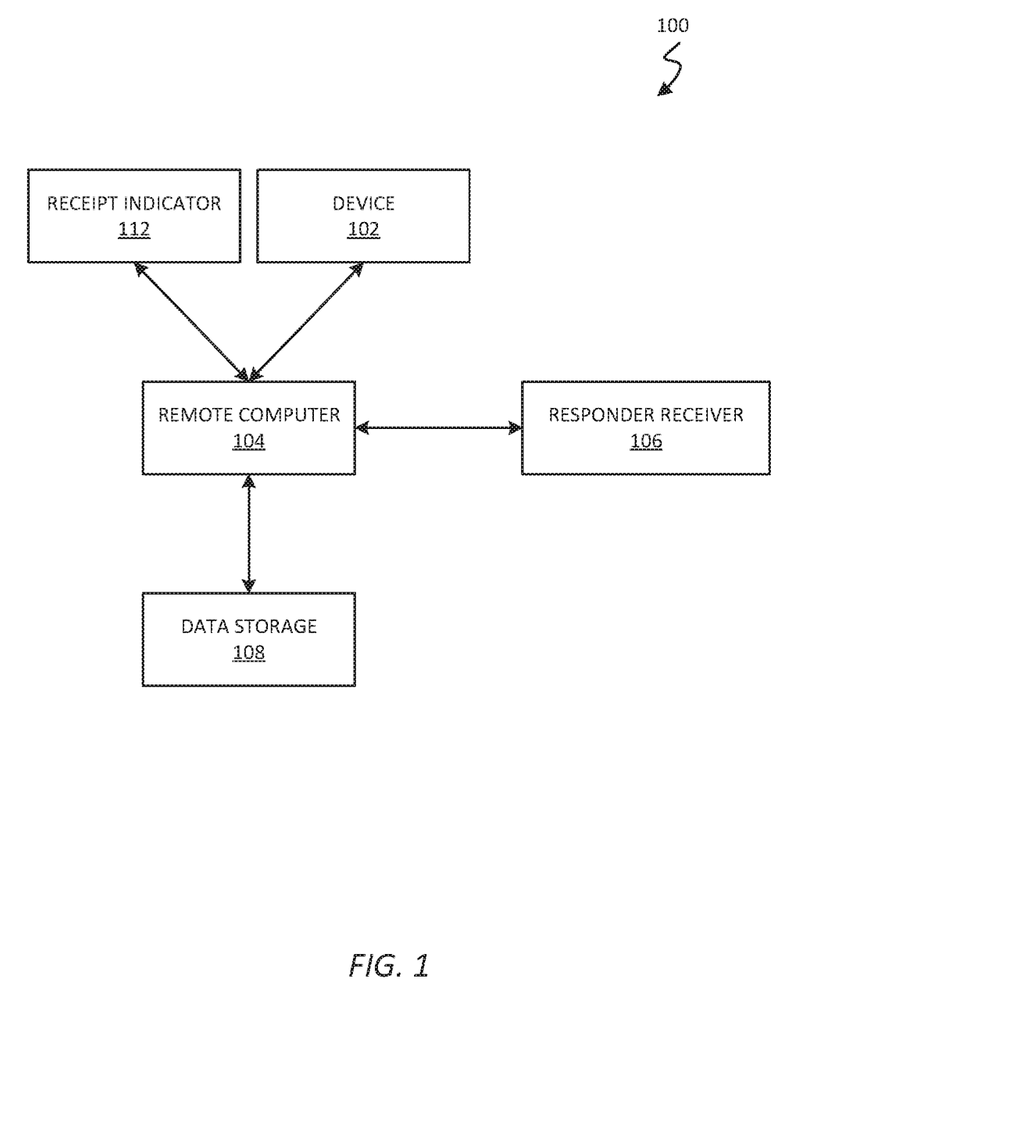
FIG. 1 is a block diagram of a system according to an example implementation.

Referring now to the figures, FIG. 1 is an example system 100 for relaying a distress signal from a device 102 to an emergency responder, according to an example implementation. The system 100 can include a device 102, a remote computer 104, and a responder receiver 106.

The device 102 can include a sensor to detect a trigger signal, which indicates that a user of the device 102 is in distress and in need of assistance. In response to detecting the trigger signal, the device 102 can transmit a distress signal to the remote computer 104. Example implementations of the device 102 will be described further herein below with reference to FIGS. 2 and 3.

The remote computer 104 of FIG. 1 can include one or more hardware components such as a processor, a machine-readable medium, a display device, a user interface, and a communications interface, and will be described further herein with reference to FIGS. 4 and 5. In some example implementations, the remote computer 104 can form part of an emergency dispatch center.

In response to receiving the distress signal from the device 102, the remote computer 104 can prepare responder information and transmit the responder information to a responder receiver 106. The responder receiver 106 can be, for example, a radio, a computer, a pager, and/or a communications device by which an emergency responder can receive a dispatch and/or information concerning an emergency. The responder information prepared and transmitted by the remote computer 104 can include information that aids an emergency responder in responding to an emergency.

In some example implementations, the remote computer 104 can be in communication with one or more data storages 108, by way of a wired or wireless data connection, and the remote computer 104 can retrieve situational information from the data storage 108 and transmit the situational information to the responder receiver 106. The situational information can be information that is deemed useful to emergency responders in planning and executing an emergency response. Data storage 108 can include a memory, a storage, a computer, a server, a mainframe, a database service, and/or the like, and the situational information stored therein can include medical records, municipal records, police records, and/or the like. Retrieval of the situational information by the remote computer 104 will be described further herein below with reference to FIGS. 5 and 8.

In an example implementation, after the remote computer 104 has received the distress signal from the device 102, the remote computer 104 can transmit a distress signal receipt to a receipt indicator 112. In some example implementations, the receipt indicator 112 may be part of device 102. In some example implementations, the receipt indicator 112 can be a device that provides, upon receiving the distress signal receipt, a visual confirmation (e.g., a light, a readable display, and/or the like), an audible confirmation (e.g., a tone, a spoken message, and/or the like), and/or a tactile confirmation (e.g., a vibration). By virtue of the distress signal receipt, the user of the device 102 can feel assured that assistance is forthcoming. In some example implementations, the distress signal receipt can be transmitted from the remote computer 104 to the device 102, and the device 102 relays the distress signal receipt to a receipt indicator 112 (e.g., by a close-range wireless communication such as near-field communication, Bluetooth, and the like).

Figure 2:
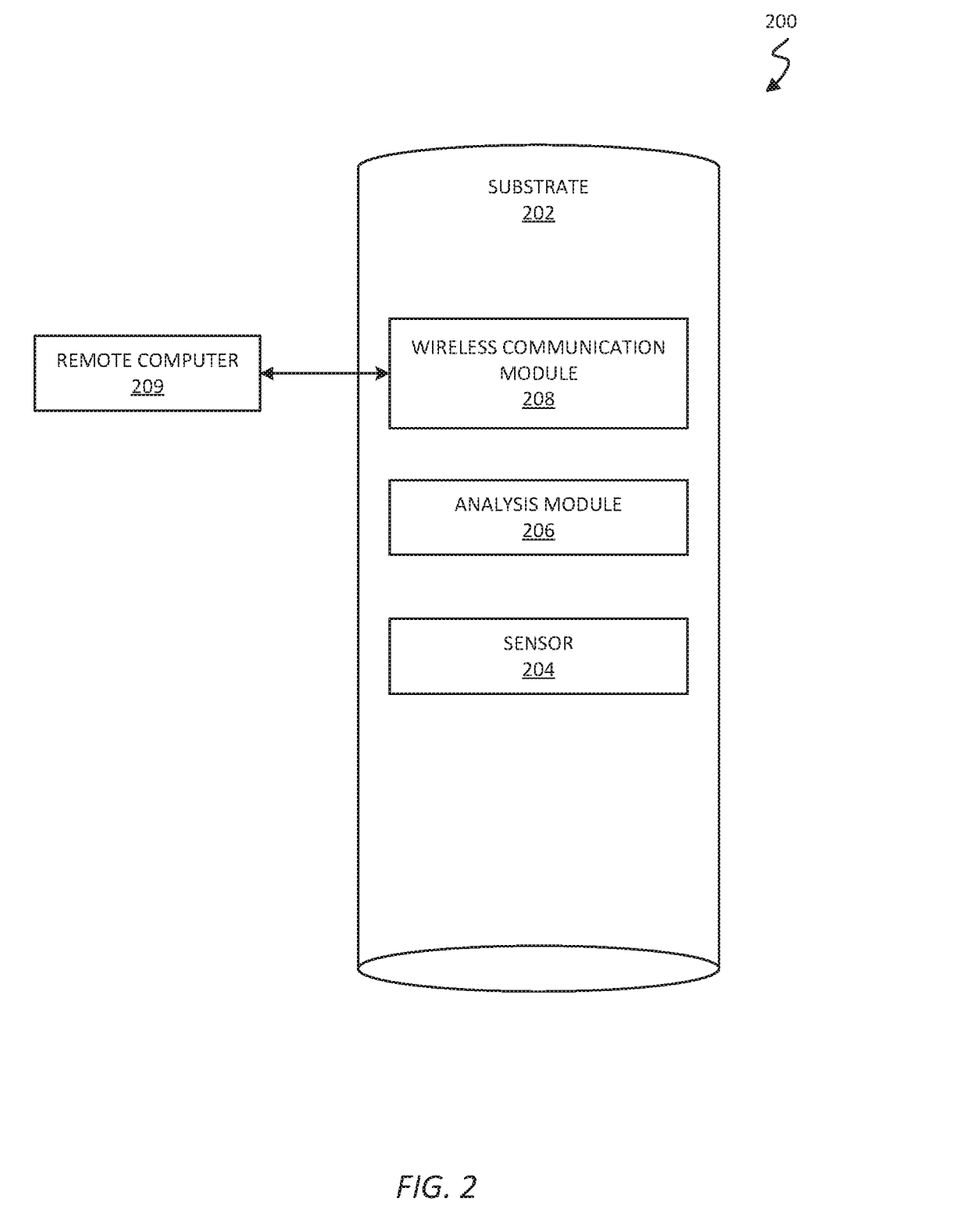
FIG. 2 is a block diagram of a device for transmitting a distress signal according to an example implementation.

FIG. 2 is a block diagram of an example device 200 that can include a substrate 202, a sensor 204, an analysis module 206, and a wireless communication module 208. In some example implementations, device 200 can serve as device 102 of FIG. 1. A module, as referred to herein, can include a set of instructions encoded on a machine-readable and executable by a processor of the device. Additionally or alternatively, a module may include a hardware device comprising electronic circuitry for implementing functionality described herein.

The substrate 202 can be fiber-shaped and can form the physical structure of the device 200. In one example implementation, at least one of the sensor 204, the analysis module 206, and the wireless communication module 208 are embedded in the substrate 202.

By virtue of the substrate 202 being fiber-shaped, the device 200 can be worn by a user such that the device 200 is inconspicuous and readily accessible (that is, unobtrusive and readily carried on or with the user frequently or at all times). For example, the device 200 can be integrated (e.g., woven) into fabric, clothing, accessories, or other wearable items.

The sensor 204 can convert a stimulus (e.g., sound, light, temperature, motion, pressure, magnetism, and the like) into a sensor signal representative of the stimulus.

The analysis module 206 can receive the sensor signal from the sensor 204 and determines if the sensor signal includes a trigger signal. In some example implementations, the analysis module 206 can be configured with a signal processing technique suitable for analyzing the content of the sensor and determining if the sensor signal includes the trigger signal. In other words, the analysis module 206 can monitor the content of the sensor signal for the trigger signal. In some example implementations, the trigger signal can correspond with a distress condition (e.g., an emergency situation) of the user of the device 200, and can be pre-programmed into device 200, and more particularly, into analysis module 206.

Figure 3:
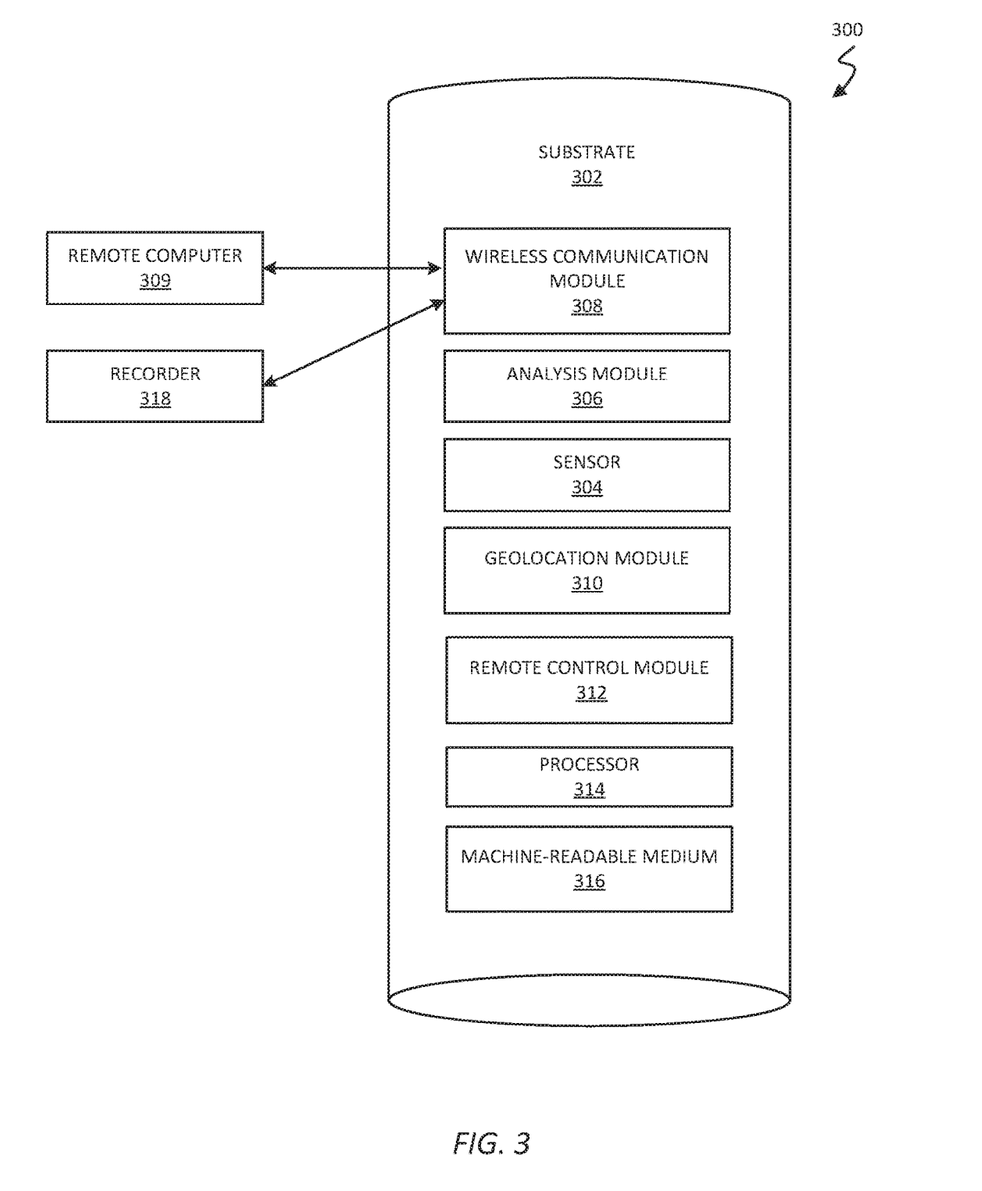
FIG. 3 is a block diagram of a device for transmitting a distress signal according to another example implementation.

In some example implementations, the analysis module 306 continuously (or periodically) receives the sensor signal and analyzes the sensor signal to determine if the sensor signal includes the trigger signal. By virtue of continuously receiving and analyzing the sensor signal, the device 300 can monitor for the trigger signal (and thus, an emergency distress situation) with minimal interaction from the user of the device 200.

The wireless communication module 208 can transmit a distress signal to a remote computer 209, in response to the analysis module 206 determining that the sensor signal includes the trigger signal. In some example implementations, the wireless communication module 208 can include a Wi-Fi radio, a Bluetooth or low-energy Bluetooth radio, a Zigbee radio, a cellular data radio, a satellite communication radio, near-field communication radio, and/or other short or long-range radios for communicating directly or indirectly with the remote computer 209. The remote computer 209 can be analogous (e.g., have functions and/or components similar to) to the remote computer 104 of FIG. 1. In some example implementations, the remote computer 209 can be located at an emergency dispatch center, and additionally or alternatively, the remote computer 209 can be located with an emergency responder.

FIG. 3 is a block diagram of an example device 300 according to another example implementation. Device 300 can include a substrate 302, a sensor 304, an analysis module 306, and a wireless communication module 308, which can be analogous in many respects to the substrate 202, the sensor 204, the analysis module 206, and the wireless communication module 208, respectively. In some example implementations, device 300 can also include a geolocation module 310, a remote control module 312, a processor 314, and a machine-readable medium 316. As with the device 200 of FIG. 2, the device 300 of FIG. 3 can serve as device 102 of FIG. 1 in some example implementations.

The device 300 can include a processor 314 and a machine-readable medium 316. The processor 314 can include a central processing unit, a multiple processing unit, a microprocessor, an application-specific integrated circuit, a field programmable gate array, and/or a hardware device suitable for retrieval and/or execution of instructions stored in the machine-readable medium 316. Additionally or alternatively, the processor 314 can include electronic circuitry for performing the functionality of device 300 described herein.

The machine-readable medium 316 can be any suitable volatile memory, non-volatile memory, or storage that contains or stores computer-executable instructions. For example, the machine-readable medium 316 can include a random access memory (RAM), an electrically erasable programmable read-only memory (EEPROM), a hard drive, an optical disc, flash memory devices, and/or the like. In some example implementations, the machine-readable medium 316 can include a non-transitory medium, where the term "non-transitory" does not encompass transitory propagating signals.

The substrate 302 can be analogous to the substrate 202 of FIG. 2. Additionally, in some example implementations, the substrate 302 can be fabricated by 3-D printing. More particularly, in an example implementation, the substrate 302 can include a 3-D printed lipid bilayer, which can be fabricated in the following example method. For example, a 3-D printer can be used to inject small aqueous droplets into a printing medium that includes amphipathic molecules, such as phospholipids. The injected aqueous droplets acquire a lipid monolayer when amphipathic molecules in the printing medium surround the aqueous droplet, owing to a hydrophilic interaction between the hydrophilic portion of the amphipathic molecules and the aqueous droplet. When lipid monolayer-enclosed droplets are in contact with each other, a lipid bilayer forms owing to the hydrophobic attraction between the contacting lipid monolayers. By controlling where the 3-D printer injects the aqueous droplets in the printing medium, a structural network of droplets having lipid bilayer interfaces can be fabricated in an additive manner, and the resulting network can form at least part of the substrate 302. In some example implementations, a substrate 302 that includes 3-D printed lipid bilayers can have biomimetic properties. In some example implementations, a substrate 302 fabricated with lipid bilayers in the foregoing manner can be 3-D printed in the form of an artificial hair, and the device 300 can be worn as an artificial hair extension.

In some example implementations, at least one of the sensor 304, the analysis module 306, the wireless communication module 308, the geolocation module 310, and the remote control module 312 can be added to the substrate 302 as the substrate 302 is being fabricated by the 3-D printing process described above. By virtue of the foregoing, at least one of the sensor 304, the analysis module 306, the wireless communication module 308, the geolocation module 310, and the remote control module 312 can be embedded in the substrate 302. As referred to herein, the term "embedded" should be understood to include implementations where the embedded module is encapsulated, as well as implementations where the embedded module is not encapsulated (e.g., the module can be exposed or can protrude).

The sensor 304 can be analogous to the sensor 204 of FIG. 2. Non-limiting examples of the sensor 304 include the following examples. In some example implementations, the sensor 304 can be an audio sensor that is sensitive to sound and outputs an audio signal as the sensor signal. In other example implementations, the sensor 304 can be sensitive to one or more mechanical quantities, such as, for example, acceleration (or deceleration), mechanical stress, mechanical strain, pressure, and/or other quantities of classical mechanics, and can output a sensor signal representative of the mechanical quantity to which it is sensitive. In yet other example implementations, the sensor 304 can be sensitive to a breakage (e.g., a breakage of the sensor 304 itself), and outputs an indication of a breakage state (e.g., breakage detected or breakage not detected). In other example implementations, the sensor 304 can be sensitive to temperature and can output a sensor signal representing the temperature. In some example implementations, the sensor signal can be stored in the machine-readable medium 316, and the stored sensor signal can be retrieved later.

The analysis module 306 can be analogous to the analysis module 206 of FIG. 2. As with analysis module 206, the analysis module 306 can be configured with a signal processing technique suitable for analyzing the content of the sensor and determining if the sensor signal includes the trigger signal. Example implementations of the analysis module 306 corresponding to the above described examples of sensor 304 will now be described.

In the example implementation described above where the sensor 304 is an audio sensor and the sensor signal is an audio signal, the trigger signal can be a sound pattern recognizable by the analysis module 306. For example, the sound pattern can be a spoken code word (e.g., spoken by the user of the device 300), a distinct sound (e.g., the sound of glass shattering, fabric tearing, a gunshot, or the like), and/or other sound-based trigger signals associated with a distress condition, and the analysis module 306 can recognize the sound pattern (i.e., determine that the sensor signal includes the trigger signal) by sound analysis techniques, such as hidden Markov models. In some example implementations, the sound pattern can be pre-programmed into the analysis module 306 and/or into the machine-readable medium 316.

In further example implementations, the analysis module 306 can recognize more than one different sound patterns, and some sound patterns correspond to different distress situations. As non-limiting examples, the sound patterns can be one or more code words such as "police," "fire," "medical," or "car accident," each of which could be spoken by a user of the device 300 in different distress situations. In some example implementations, the sound pattern can also be a user-defined code word pre-programmed into the device 300.

In the example implementations described above where the sensor 304 is sensitive to a mechanical quantity, the trigger signal can be a sensor signal that exceeds a predetermined threshold (e.g., a threshold associated with an acceptable or safe level of the mechanical quantity to which the sensor 304 is sensitive). For example, if a user uses a device 300 having a sensor 304 that is sensitive to acceleration and deceleration and the user suffers a car accident, the sudden deceleration resulting from the car accident can be recorded by the sensor 304 in the sensor signal, and the analysis module 306 can detect a trigger signal in the portion of the sensor signal that exceeds a predetermined deceleration threshold.

In the example implementations where the sensor 304 is sensitive to a breakage, the trigger signal can be an indication that the sensor has detected a breakage. For example, in the case where the device 300 can be integrated into fabric, as described above, a detected breakage can indicate a tearing of the fabric.

In the example implementations described above where the sensor 304 is sensitive to temperature, the trigger signal can be a temperature sensor signal that exceeds a predetermined safety threshold, such as temperatures above a high safety threshold for detecting hyperthermic conditions (e.g., greater than 110° F., as but one example) and/or temperatures below a low safety threshold for detecting hypothermic conditions (e.g., less than 32° F., as but one example).

The wireless communication module 308 can be analogous to the wireless communication module 208 of FIG. 2. As with the wireless communication module 208, the wireless communication module 308 can transmit a distress signal to a remote computer 309 (e.g., located at an emergency dispatch center and/or with an emergency responder) in response to the analysis module 306 determining that the sensor signal includes the trigger signal, and the wireless communication module 308 can include a Wi-Fi radio, a Bluetooth or low-energy Bluetooth radio, a Zigbee radio, a cellular radio, a satellite communication radio, near-field communication radio, and/or other short or long-range radios for communicating directly or indirectly with the remote computer 309. In some implementations, the wireless communication module 106 can also receive transmissions from the remote computer 309. In other example implementations, the wireless communication module 208 can also function as a bridge between multiple radio types or communication standards.

The distress signal transmitted by the wireless communication module 308 to remote computer 309 can include the trigger signal determined to be included in the sensor signal by the analysis module 306, a predetermined distress signal (such as "user requires medical assistance" or "user requires police assistance"), a user identification, a user medical history, a live stream of the sensor signal from the sensor 304, and/or a recording of the sensor signal from the sensor 304. One or more of the foregoing components of the distress signal can be stored in and retrieved from the machine-readable medium 316.

In some example implementations, the device 300 can also include a geolocation module 310 that determines location information. For example, the geolocation module 310 can include a global positioning system (GPS) module, a Wi-Fi positioning module, a cellular locating module, and/or the like, that can determine a location of the device 300, and by extension, may also determine a location of the user of the device 300. In some example implementations, the location information determined by the geolocation module 310 can be transmitted to the remote computer 309, by way of the wireless communication module 308, for example.

In some example implementations, the device 300 can also include a remote control module 312 to remotely control a recorder 318. The recorder 318 can be an audio and/or video recording device, such as, for example, a video camera, a security camera, a closed circuit television system, a mobile phone, a tablet computing device, a webcam, an intercom, a vehicular on-board camera and/or microphone, and the like. In some example implementations, the remote control module 312 can communicate wirelessly with the recorder 318 by way of the wireless communication module 308. In some example implementations, the remote control module 312 can send a control signal to initiate the recording function of the recorder 318. In further example implementations, the remote control module 312 can send a control message to cause the recorder 318 to transmit an audio and/or video recording to the device 300, and the recording can be stored in machine-readable medium 316 and/or transmitted by wireless communication module 308 to the remote computer 309.

In some example implementations, the remote control module 312 can also send a control signal to configure the recorder 318. For example, the control signal can be a pan, tilt, and/or zoom command that configures the recorder 318 to record the audio and/or video from other perspectives. In other example implementations, the control signal can configure the sensitivity, contrast, and/or focus of the recorder 318, although these examples are non-limiting.

Figure 4:
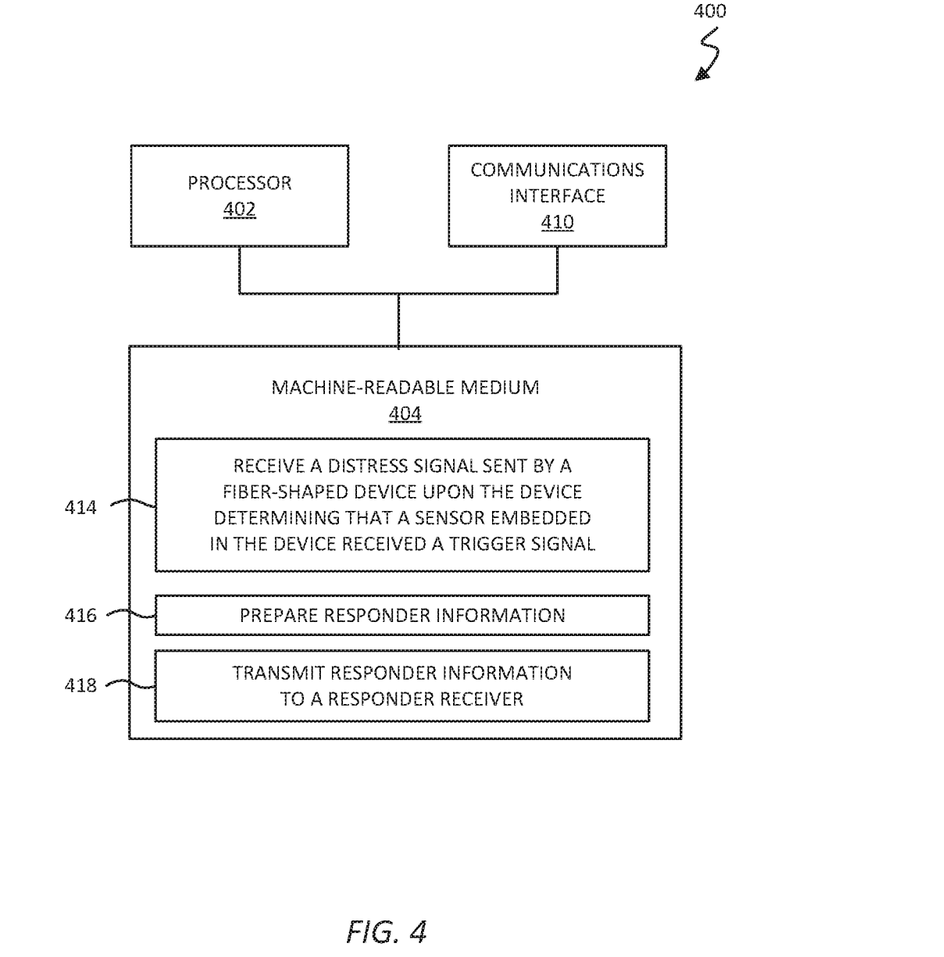
FIG. 4 is a block diagram of a device that includes a machine-readable medium encoded with instructions to receive a distress signal and to prepare and transmit responder information according to an example implementation.

FIG. 4 is a block diagram of a computer 400 that includes a machine-readable medium encoded with instructions to receive a distress signal and to prepare and transmit responder information according to an example implementation. In some implementations, computer 400 can serve as or be included in the remote computer 104 of FIG. 1, the remote computer 209 of FIG. 2, and/or the remote computer 309 of FIG. 3. In some example implementations, computer 400 can be a laptop computer, a desktop computer, a workstation, a tablet computing device, a mobile phone, a server, or the like. The computer system 400 includes a processor 402 coupled to a machine-readable medium 404. In some example implementations, the computer 400 can also include a communications interface 410.

The processor 402 can include a central processing unit, a multiple processing unit, a microprocessor, an application-specific integrated circuit, a field programmable gate array, and/or other hardware device suitable for retrieval and/or execution of instructions 414, 416, and 418 stored in the machine-readable medium 404. Additionally or alternatively, the processor 402 can include electronic circuitry for performing the functionality of instructions 414, 416, and/or 418. The machine-readable medium 404 can be any medium suitable for storing executable instructions, such as a random access memory (RAM), an electrically erasable programmable read-only memory (EEPROM), a hard drive, an optical disc, flash memory devices, and the like. In some example implementations, the machine-readable medium 404 can be a non-transitory medium, where the term "non-transitory" does not encompass transitory propagating signals. As described further herein below, the machine-readable medium 404 can be encoded with a set of executable instructions 414, 416, and 418. The communications interface 410 can include any electronic communications technology, such as Ethernet, USB, FireWire, optical fiber, Wi-Fi, Bluetooth, Zigbee, cellular communications, satellite communications, near-field communication, short or long-range radios, and the like.

Instructions 414 can receive a distress signal. The distress signal can be sent by a fiber-shaped device (such as the device 200 of FIG. 2 or the device 300 of FIG. 3) upon the fiber-shaped device determining that a sensor embedded in the fiber-shaped device received a trigger signal. In some example implementations, instructions 414 can receive the distress signal by way of the communications interface 410.

Instructions 416 can prepare responder information after receiving the distress signal. In some example implementations, instructions 416 can prepare the responder information by compiling information that can aid an emergency responder in responding to the distress signal. In some example implementations, the information can be compiled from different sources, including the distress signal from the fiber-shaped device. Some non-limiting examples of information that can be compiled include a user identification and a user location.

Instructions 418 can transmit the responder information to a responder receiver. Instructions 418 can transmit the responder information to the responder receiver via the communications interface 410 of the computer 400. In some example implementations, the responder receiver can include a radio, a desktop computer, a laptop computer, a workstation, a mobile phone, a tablet computing device, a pager, and/or any communications device by which an emergency responder can receive a dispatch and/or information concerning an emergency.

Figure 5:
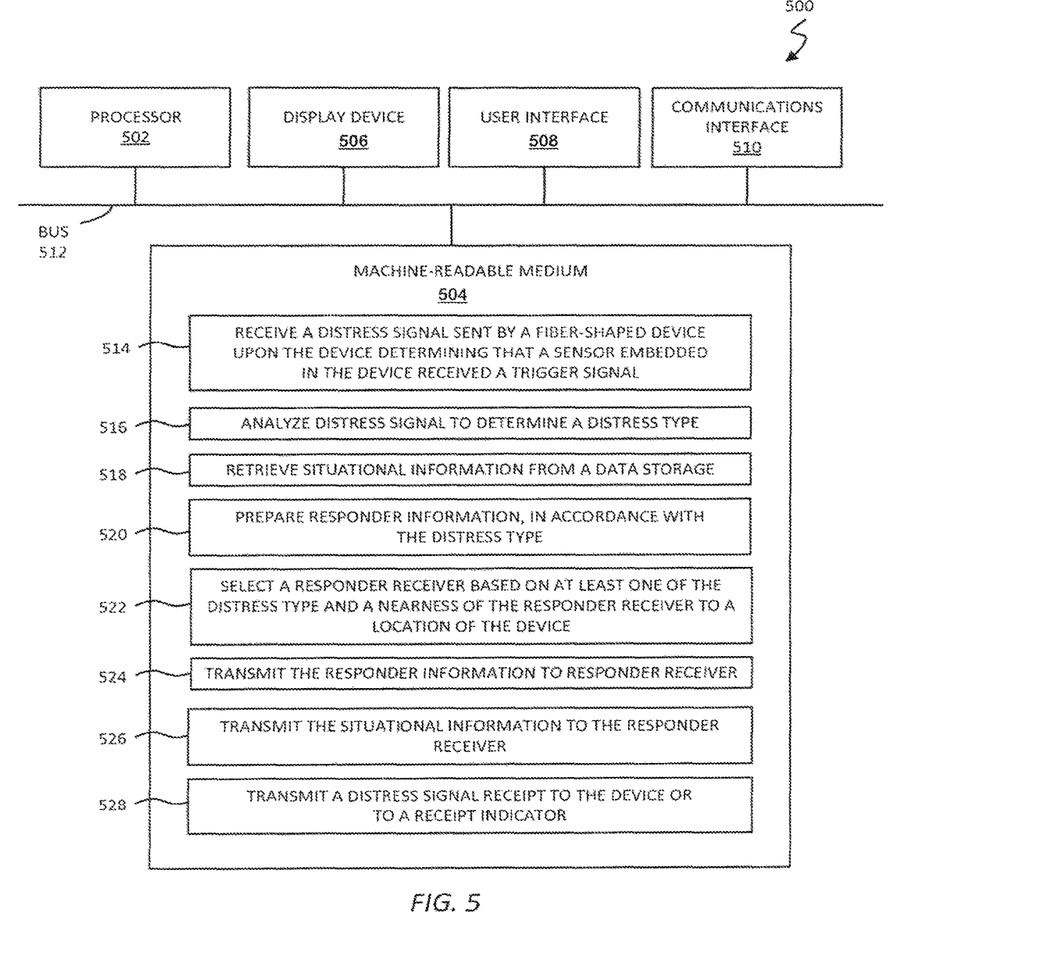
FIG. 5 is a block diagram of a device that includes a machine-readable medium encoded with instructions to receive a distress signal and to prepare and transmit responder information according to another example implementation.

FIG. 5 is a block diagram of a computer 500 that includes a machine-readable medium encoded with instructions to receive a distress signal and to prepare and transmit responder information according to another example implementation. In some implementations, computer 500 can serve as or be included in the remote computer 104 of FIG. 1, the remote computer 209 of FIG. 2, and the remote computer 309 of FIG. 3. In some example implementations, computer 500 can be a laptop computer, a desktop computer, a workstation, a tablet computing device, a mobile phone, a server, and/or the like. The computer system 500 can include a processor 502 coupled to a machine-readable medium 504. In further example implementations, the computer 500 can also include one or more of a display device 506, a user interface 508, a communications interface 510, and a bus 512.

The processor 502, the machine-readable medium 504, and the communications interface 510 can be analogous to the processor 402, the machine-readable medium 404, and the communications interface 410 of FIG. 4, respectively. As with the processor 402 of FIG. 4, the processor 502 can include a central processing unit, a multiple processing unit, a microprocessor, an application-specific integrated circuit, a field programmable gate array, and/or other hardware device suitable for retrieval and/or execution of instructions stored in the machine-readable medium 504. Additionally or alternatively, the processor 502 can include electronic circuitry for performing the functionality of instructions 514, 516, 518, 520, 522, 524, 526, and/or 528. As with the machine-readable medium 404 of FIG. 4, the machine-readable medium 504 can be any medium suitable for storing executable instructions. The machine-readable medium 504 can be encoded with a set of executable instructions 514, 516, 518, 520, 522, 524, 526, and 528. As with the communications interface 410 of FIG. 4, the communications interface 510 can include any electronic communications technology, such as Ethernet, USB, FireWire, optical fiber, Wi-Fi, Bluetooth, Zigbee, cellular communications, satellite communications, near-field communication, short or long-range radios, and the like.

The display device 506 can include, for example, a monitor, a screen, a light, a speaker, and/or other audio and/or visual devices. The user interface 508 can include, for example, a keyboard, a mouse, a touch-screen, and/or the like. The bus 512 can be used to couple the processor 502, the machine-readable medium 504, the display device 506, the user interface 508, and/or the communications interface 510.

Instructions 514 can be analogous to instructions 414 of FIG. 4. As with instructions 414, instructions 514 can receive a distress signal sent by a fiber-shaped device (such as device 200 of FIG. 2 or device 300 of FIG. 3) upon the device determining that a sensor embedded in the device received a trigger signal, and instructions 514 can receive the distress signal by way of the communications interface 510.

Instructions 516 can analyze the distress signal to determine a distress type. For example, instructions 516 can determine the distress type to be one or more of a police emergency, a fire emergency, a medical emergency, and the like. In some example implementations, instructions 516 determines the distress type directly by virtue of the distress type being included in the distress signal. As another example, if the distress signal includes an audio signal recorded by the sensor of the fiber-shaped device, instructions 516 can analyze the sound signal to determine distress type (e.g., an audio signal comprising a spoken code word of "fire emergency" may be determined by instructions 516 to correspond to a fire emergency). In another example, if the distress signal includes a high acceleration or deceleration, instructions 516 may determine that a car accident has occurred, and the distress type may be a medical and police emergency. In another example, if the distress signal includes a very high temperature, the processor 502 may determine that the distress type includes at least a fire emergency.

Instructions 518 can retrieve situational information from a data storage. In some example implementations, the situational data can be information that is deemed useful to emergency responders in planning and executing an emergency response. For example, for a medical emergency, it may be deemed useful to medical responders to retrieve a medical history of the user of the fiber-shaped device (including, for example, demographics, medications, allergies, immunization status, lab test results, and/or other medical history) from a data storage (such as an electronic medical record system). As another example, for a police emergency, it may be deemed useful to police responders to retrieve tactical information from a data storage such as, for example, maps, building floor plans, municipal records, police records of any alleged perpetrators involved, and the like. The data storage can include a memory, a storage, computer, a server, a mainframe, a database service, and/or the like. In some example implementations, instructions 518 can utilize communications interface 510 to retrieve situational information from the data storage. In some example implementations, the data storage described with respect to instructions 518 can be analogous to the data storage 108 of FIG. 1.

Instructions 520 can prepare responder information after the distress signal is received, and more particularly, in some example implementations, instructions 520 prepare the responder information in accordance with the distress type determined by instructions 516. Instructions 520 can prepare the responder information by compiling information that can aid an emergency responder and is deemed applicable to the distress type. Non-limiting examples of information available for compiling into responder information include, but are not limited to, the distress signal received in block 514, a distress type (i.e., the nature of the emergency), a user identification (i.e., information identifying the user of the fiber-shaped device), a user medical history (i.e., the medical history of the user of the fiber-shaped device), a sensor signal received from the fiber-shaped device, information received from a recorder controlled remotely by the fiber-shaped device (e.g., information from the recorder 318 controlled by the device), and a user location. In some example implementations, information available for compiling into responder information can be predetermined as being applicable to at least some distress types.

For example, drug allergies included in the user medical history may be deemed (or predetermined to be) important to be include in the responder information if the distress type is a medical emergency, but the drug allergies may be deemed (or predetermined to be) less important or unnecessary to include in the responder information if the distress type is a fire emergency. On the other hand, in some example implementations, the user location may be deemed (or predetermined to be) important to all distress types, and can be included whenever responder information is prepared.

Instructions 522 can select a responder receiver based on at least one of the distress type and a nearness of the responder receiver to a location of the fiber-shaped device. As an example of selecting the responder receiver based on the distress type, instructions 522 can select a fire department responder receiver based on the distress type being a fire emergency (e.g., as determined by instructions 516). As an example of selecting the responder receiver based on a location of the fiber-shaped device, instructions 522 can receive the location of the fiber-shaped device (e.g. a location of device 300 can be determined by the geolocation module 310), compare the location of the fiber-shaped device 300 with the location of each of a plurality of responder receivers using a traffic routing system (or other methods of mapping and routing), and select at least one of the responder receivers closest to the fiber-shaped device.

Instructions 524 can transmit the responder information to a responder receiver. In some example implementations, the responder receiver can be the responder receiver selected by instructions 522. The responder information can be transmitted to the responder receiver via the communications interface 510 of the computer 500. In some example implementations, the responder receiver can include a radio, a desktop computer, a laptop computer, a workstation, a mobile phone, a tablet computing device, a pager, and/or any communications device by which an emergency responder can receive a dispatch and/or information concerning an emergency.

Instructions 526 can transmit the situational information to the responder receiver. Instructions 526 can transmit the situational information to the responder receiver via the communications interface 510 of the computer 500. In some example implementations, instructions 526 can transmit the situational information to the responder receiver together with or as part of the responder information transmitted in by instructions 524.

Instructions 528 can transmit a distress signal receipt to the fiber-shaped device or to a receipt indicator. In some example implementations, instructions 528 can transmit the distress signal receipt via the communications interface 510 of the computer 500. In some example implementations, the receipt indicator can be analogous to the receipt indicator 112 described above with reference to FIG. 1. In some example implementations, the distress signal receipt can cause the fiber-shaped device or the receipt indicator 112 to present a visual confirmation (e.g., a light, a readable display, and/or the like), an audible confirmation (e.g., a tone, a spoken message, and/or the like), and/or a tactile confirmation (e.g., a vibration).

Figure 6:
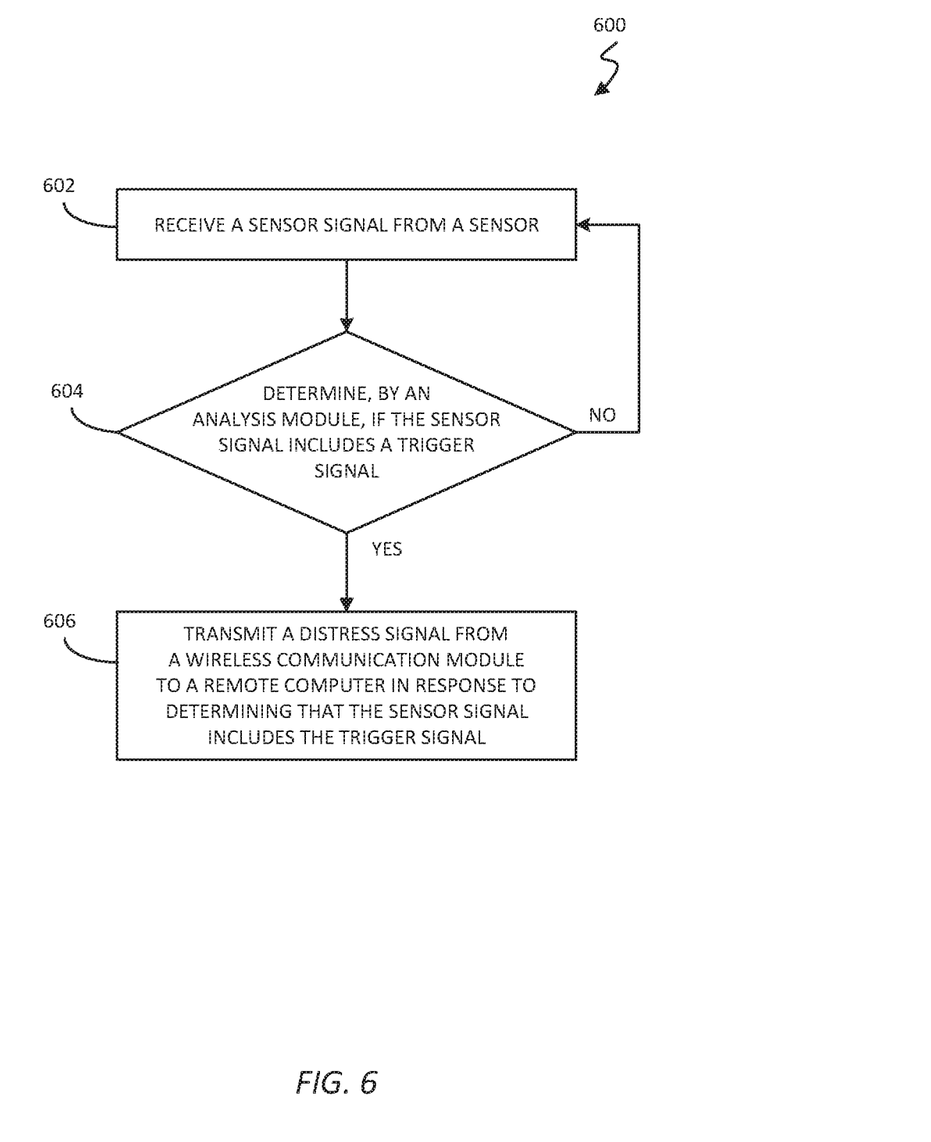
FIG. 6 is a flow diagram of a method for transmitting a distress signal according to an example implementation.

FIG. 6 is a flow diagram of a method 600 performed by a device 200 according to an example implementation. Although execution of the method 600 is described below with reference to the device 200 of FIG. 2, it should be understood that execution of the method 600 can be performed by other suitable devices, such as the device 300 of FIG. 3. The method 600 can be implemented in the form of executable instructions stored on a machine-readable medium and/or in the form of electronic circuitry.

The method 600 can start at block 602. In block 602, a sensor signal is received from a sensor. In some example implementations, the sensor signal can be received by an analysis module 206 from the sensor 204. As described above with reference to FIG. 2, the sensor 204 converts a stimulus (e.g., sound, light, temperature, motion, pressure, magnetism, and the like) to the sensor, which is representative of the stimulus.

In block 604, the analysis module 206 determines if the sensor signal received in block 602 includes a trigger signal. In some example implementations, the trigger signal can correspond with a distress condition (e.g., an emergency situation) of a user of the device 200. To perform block 604, the analysis module 206 can utilize any signal processing technique suitable for analyzing the content of the sensor and determining if the sensor signal includes the trigger signal.

If it is determined in block 604 that the sensor signal does include the trigger signal ("NO" at block 604), the method 600 returns to block 602. By virtue of returning to block 602, the method 600 can continuously monitor the trigger signal for a distress condition associated with the trigger signal.

If it is determined in block 604 that the sensor signal includes the trigger signal ("YES" at block 604), in response, the method 600 proceeds to block 606. In block 606, a distress signal is transmitted from a wireless communication module 208 to a remote computer 209, which can be located at an emergency dispatch center and/or with an emergency responder.

Figure 7:
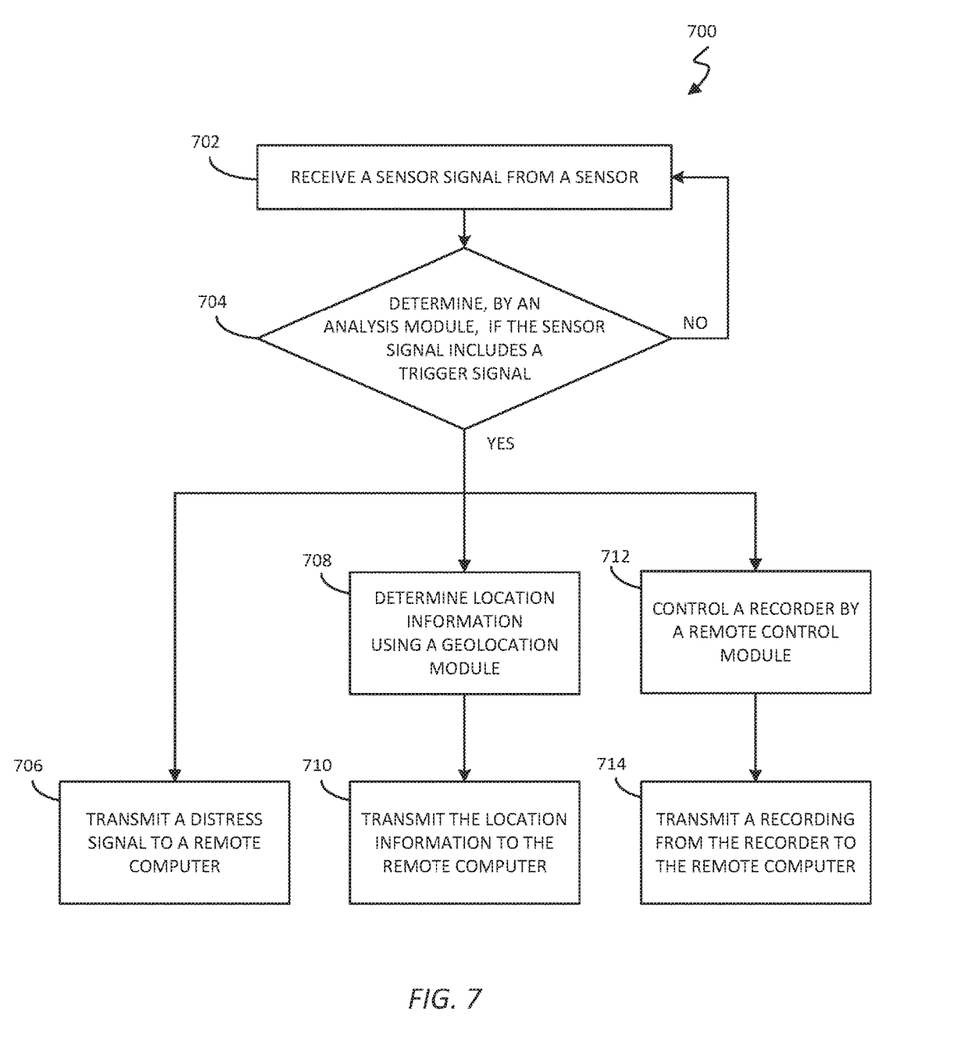
FIG. 7 is a flow diagram of a method for transmitting a distress signal according to another example implementation.

FIG. 7 is a flow diagram of a method 700 performed by a device 300 according to an example implementation. Although execution of the method 700 is described below with reference to the device 300 of FIG. 3, it should be understood that at least portions of execution of the method 700 can be performed by other suitable devices, such as the device 200 of FIG. 2. The method 700 can be implemented in the form of executable instructions stored on a machine-readable medium and/or in the form of electronic circuitry.

The method 700 can start at block 702. Block 702 can be analogous to block 602 of method 600. As with block 702, the analysis module 306 can receive the sensor signal from the sensor 304. For example, the sensor 304 can be an audio sensor that converts sound to a sensor signal representative of the sound, and the analysis module 306 receives the sound-representing sensor signal. In other example implementations, the sensor 304 can be sensitive to one or more mechanical quantities, such as acceleration (or deceleration), mechanical stress, mechanical strain, pressure, and/or other quantities of classical mechanics, and the analysis module 306 receives a sensor signal representative of the quantity to which the sensor 304 is sensitive, such as an acceleration or deceleration value, a stress value, a strain value, or a pressure value. In yet other example implementations, the sensor 304 can be sensitive to a breakage (e.g., a breakage of the sensor 304 itself), and the analysis module 306 receives an indication of a breakage state (e.g., breakage detected or breakage not detected). In other example implementations, the sensor 304 can be sensitive to temperatures, and the analysis module 306 receives a sensor signal corresponding to the temperature. It should be understood that the method 700 is not limited to these example sensor types.

Block 704 can be analogous to block 604 of method 600. Similar to block 604, the analysis module 306 determines if the sensor signal received in block 702 includes a trigger signal, which can correspond with a distress condition of a user of the device 300, and the analysis module 306 can utilize any signal processing technique suitable for analyzing the content of the sensor and determining if the sensor signal includes the trigger signal.

Example implementations of block 704 corresponding to the above described examples of sensor signals received in block 702 will now be described.

For example, in the example implementation where the analysis module 306 receives a sensor signal representing sound (i.e., the sensor 304 is an audio sensor), the analysis module 306 can use an audio signal processing technique, such as a hidden Markov model-based sound recognition algorithm, to detect and/or recognize a sound pattern in the sensor signal in block 704. For example, the sound pattern can be a spoken code word (e.g., spoken by the user of the device 300), a distinct sound (e.g., the sound of glass shattering, fabric tearing, a gunshot, or the like), and/or other sound-based trigger signals associated with a distress condition. In some example implementations, the sound pattern can be pre-programmed into the analysis module 306 or into the machine-readable medium 316.

In further example implementations, the analysis module 306 can recognize more than one different sound patterns, and some sound patterns correspond to different distress situations. As non-limiting examples, the sound patterns can be one or more code words such as "police," "fire," "medical," or "car accident," each of which could be spoken by a user of the device 300 in different distress situations. The sound pattern can also be a user-defined code word pre-programmed into device 300 (e.g., pre-programmed into the analysis module 306 or into the machine-readable medium 316).

In the example implementations described above where analysis module 306 receives a sensor signal representing a mechanical quantity from a sensor 304 sensitive to one or more quantities of classical mechanics, the analysis module 306 can analyze, in block 704, whether the sensor signal exceeds a predetermined threshold (i.e., a threshold associated with an acceptable or safe level of the mechanical quantity), and the portion of the sensor signal that exceeds the threshold can be determined to be the trigger signal in block 704. As an illustration, a device 300 with a sensor 304 can be sensitive to acceleration/deceleration, and an analysis module 306 receives a sensor signal representative of acceleration/deceleration. If a user of the device 300 is in a car accident, the sudden deceleration of the user resulting from the accident may be observed in the sensor signal, and the analysis module 306 can determine that the sudden deceleration included in the sensor signal exceeds a predetermined threshold and is thereby deemed the trigger signal.

In the example implementations where the analysis module 306 receives a sensor signal indicating whether or not there is a breakage from a breakage-sensitive sensor 304, the analysis module 306 can directly determine whether the sensor signal indicates there is a breakage. For example, in the case where the device 300 can be integrated into fabric, as described above, a detected breakage can indicate a tearing of the fabric.

In the example implementations described above where the analysis module 306 receives a sensor signal representing temperature from a temperature-sensitive sensor 304, the analysis module 306 can analyze, in block 704, whether the sensor signal includes a trigger signal by virtue of exceeding a predetermined safety threshold, such as temperatures above a high safety threshold for detecting hyperthermic conditions (e.g., the sensor signal is greater than 110° F., as but one example) and/or temperatures below a low safety threshold for detecting hypothermic conditions (e.g., the sensor signal is less than 32° F., as but one example).

If it is determined that the sensor signal does include the trigger signal ("NO" at block 704), the method 700 returns to block 702. On the other hand, in response to determining that the sensor signal includes the trigger signal ("YES" at block 704), the method proceeds to block 706.

As described above, the method 700 proceeds from block 704 to block 706 in response to determining that the sensor signal includes the trigger signal ("YES" at block 704). Similarly, the method 700 also can proceed from block 704 to block 708 and then to block 710, in response to determining that the sensor signal includes the trigger signal. Also, the method 700 also can proceed from block 704 to block 712 and then to block 714, in response to determining that the sensor signal includes the trigger signal. Before describing blocks 708, 710, 712, and 714, block 706 will first be described.

In block 706, a distress signal is transmitted from a wireless communication module 308 to a remote computer, such as remote computer 309, which can be located at an emergency dispatch center and/or with an emergency responder. Block 706 can be analogous to block 606 of FIG. 6.

In some example implementations, the distress signal transmitted by the wireless communication module 308 to remote computer 309 can include the trigger signal determined to be included in the sensor signal by the analysis module 306 in block 704, a predetermined distress signal, a user identification, a user medical history, a live stream of the sensor signal from the sensor 304, and/or a recording of the sensor signal from the sensor 304. For example, the predetermined distress signal can be a message such as "user requires medical assistance" or "user requires police assistance." Additionally, examples of the live stream and the recording of the sensor signal can include, an audio sensor signal from a sound-sensitive sensor, a temperature sensor signal from a temperature-sensitive sensor, and the like. In some examples implementations, one or more of the foregoing components of the distress signal can be stored in the machine-readable medium 316, and in block 706 the analysis module 306 retrieves components of the distress signal from the machine-readable medium 316 and transmits the components via wireless communication module 308.

Blocks 708 and 710 will now be described. Although blocks 708 and 710 are shown in FIG. 7 as following "YES" at block 704 and also are shown in a pathway parallel to block 706 and parallel to the pathway containing blocks 712, and 714, it should be understood that, in other example implementations, blocks 708 and 710 can be performed in series between blocks 702 and 704, or that blocks 706, 708, 710, 712, and/or 714 can be performed in series following "YES" at block 704.

In block 708, a geolocation module 310 determines location information. For example, the location information can include the location of the device 300, and by extension, may also include a location of the user of the device 300. The geolocation module 310 can determine the location information by using GPS technology, a Wi-Fi positioning technique, a cellular locating technique, and the like.

In block 710, the location information determined by geolocation module 310 in block 708 can be transmitted to the remote computer 309, by way of the wireless communication module 308, for example. In some example implementations, block 710 can be performed in parallel with block 706, and the location information can be included in the distress signal.

Blocks 712 and 714 will now be described. Although blocks 712 and 714 are shown in FIG. 7 as following "YES" at block 704 and also are shown in a pathway parallel to block 706 and parallel to the pathway containing blocks 708 and 710, it should be understood that, in other example implementations, blocks 712 and 714 can be performed in series between blocks 702 and 704, or that blocks 706, 708, 710, 712, and/or 714 can be performed in series following "YES" at block 704.

In block 712, a remote control module, such as the remote control module 312 of the device 300, can control a recorder 318. In some example implementations, controlling the recorder 318 can include sending a control signal (e.g., from the remote control module 312 by way of the wireless communication module 308) to initiate a recording function of the recorder 318. The recorder can be an audio and/or video recording device, such as, for example, a video camera, a security camera, a closed circuit television system, a mobile phone, a tablet computing device, a webcam, an intercom, a vehicular on-board camera and/or microphone, and the like.

In some example implementations, controlling the recorder in block 712 can also include sending a control signal to cause the recorder 318 to transmit an audio and/or video recording to the device 300. Once received by the device 300 (e.g., by way of the wireless communication module 308), the audio and/or video recording can be stored in the machine-readable medium 316.

In some example implementations, controlling the recorder in block 712 can also include sending a control signal to configure the recorder 318. For example, the control signal can be a pan, tilt, and/or zoom command that configures the recorder 318 to record the audio and/or video from other perspectives. In other example implementations, the control signal can configure the sensitivity, contrast, and/or focus of the recorder 318, although these examples are non-limiting.

In block 714, a recording from the recorder 318 can be transmitted to the remote computer 309. For example, as described above with respect to block 712, the recorder 318 in block 712 can be controlled to transmit an audio and/or video recording to the device 300. Once received by the device 300, the audio and/or video recording can be transmitted in block 714 by the wireless communication module 308 to the remote computer 309, in some example implementations.

Figure 8:
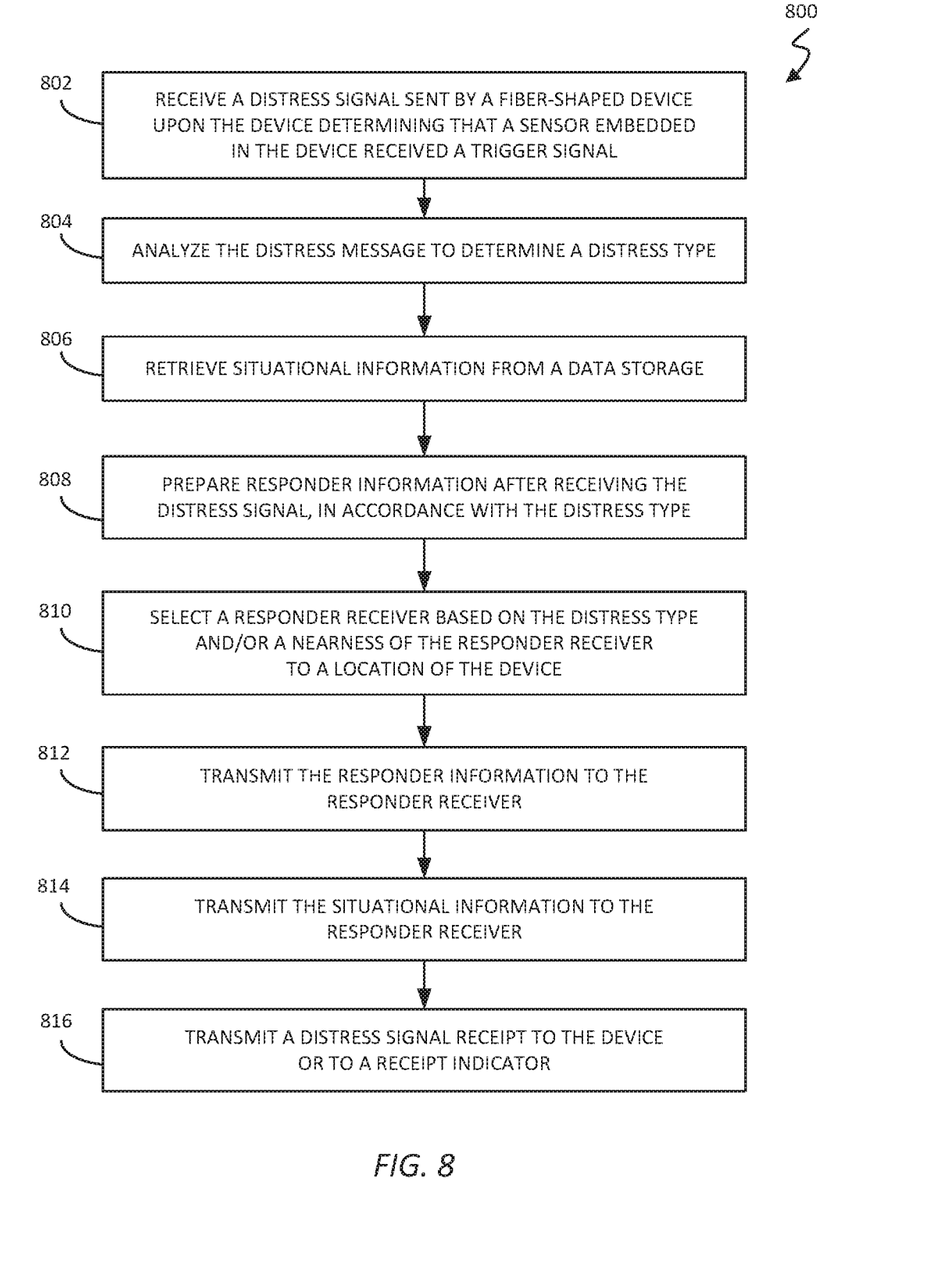
FIG. 8 is a flow diagram of a method for preparing and transmitting responder information according to an example implementation.

FIG. 8 is a flow diagram of a method 800 performed by the computer 500 according to an example implementation. Although execution of the method 800 is described below with reference to the processor 502 of FIG. 5 (and more generally, with reference to the computer 500), it should be understood that execution of the method 800 can be performed by other suitable devices, such as the processor 402 of FIG. 4 (and more generally, the computer 400). The method 800 can be implemented in the form of executable instructions stored on a machine-readable medium and/or in the form of electronic circuitry.

The method 800 can start at block 802. In block 802, the processor 502 can receive a distress signal sent by a fiber-shaped device upon the device determining that a sensor embedded in the device received a trigger signal. In some example implementations, the processor 502 uses the communications interface 510 to receive the distress signal. In some example implementations, the fiber-shaped device sending the distress signal can be the device 200 of FIG. 2 or the device 300 of FIG. 3, and the determining performed by the device 200 and the device 300 can be as described above at block 604 of FIG. 6 and block 704 of FIG. 7, respectively.

In block 804, the processor 502 analyzes the distress signal received in block 802 to determine a distress type, such as a police emergency, a fire emergency, a medical emergency, and the like. In some example implementations, the processor 502 determines the distress type directly by virtue of the distress type being included in the distress signal. As another example, if the distress signal includes an audio signal recorded by a sound-sensitive sensor of a fiber-shaped device, the processor 502 can analyze the audio signal to determine the distress type (e.g., an audio signal comprising a spoken code word of "fire emergency" may be determined by the processor 502 to correspond to a fire emergency). In another example, if the distress signal includes a high acceleration or deceleration, the processor 502 may determine that a car accident has occurred, and the distress type may be a medical and police emergency. In another example, if the distress signal includes a very high temperature, the processor 502 may determine that the distress type includes at least a fire emergency.

In block 806, the processor 502 can retrieve situational information from a data storage. In some example implementations, the situational data can be information that is deemed useful to emergency responders in planning and executing an emergency response. For example, for a medical emergency, it may be deemed useful to medical responders to retrieve a medical history of the user of the fiber-shaped device (including, for example, demographics, medications, allergies, immunization status, lab test results, and/or other medical history) from a data storage (such as an electronic medical record system). As another example, for a police emergency, it may be deemed useful to police responders to retrieve tactical information from a data storage such as, for example, maps, building floor plans, municipal records, police records of any alleged perpetrators involved, and the like. The data storage can include a memory, a storage, computer, a server, a mainframe, a database service, and/or the like. The data storage can include a memory, a storage, computer, a server, a mainframe, a database service, and the like, and in some example implementations, the processor 502 can utilize communications interface 510 to retrieve situational information from the data storage. In some example implementations, the data storage described with respect to block 806 can be analogous to the data storage 108 of FIG. 1.

In block 808, the processor 502 can prepare responder information, after receiving the distress signal. In some example implementations, the processor 502 performs block 808 by compiling information that can aid an emergency responder in responding to an emergency. In some example implementations, the information can be compiled from different sources, including the distress signal from the fiber-shaped device. Some non-limiting examples of information that can be compiled include a user identification and a user location.

More particularly, in some example implementations, the processor 502 can prepare responder information in block 808 in accordance with the distress type determined in block 804 by compiling information that can aid an emergency responder and is deemed applicable to the distress type determined in block 804. Non-limiting examples of information available for compiling into responder information include, but are not limited to, the distress signal received in block 802, a distress type (i.e., the nature of the emergency), a user identification (i.e., information identifying the user of the fiber-shaped device), a user medical history (i.e., the medical history of the user of the fiber-shaped device), a sensor signal received from the fiber-shaped device, information received from a recorder controlled remotely by the fiber-shaped device (e.g., information from the recorder 318 controlled by the device 300), and a user location. In some example implementations, information available for compiling into responder information can be predetermined as being applicable to at least some distress types. For example, drug allergies included in the user medical history may be deemed (or predetermined to be) important to be include in the responder information if the distress type is a medical emergency, but the drug allergies may be deemed (or predetermined to be) less important or unnecessary to include in the responder information if the distress type is a fire emergency. On the other hand, in some example implementations, the user location may be deemed (or predetermined to be) important to all distress types, and can be included whenever responder information is prepared.

In block 810, the processor 502 can select a responder receiver (e.g., responder receiver 106 in FIG. 1) based on the distress type determined in block 804 and/or a nearness of the responder receiver to a location of the fiber-shaped device. As an example of selecting the responder receiver based on the distress type, the processor 502 can select a fire department responder receiver in a case where the distress type is determined to be a fire emergency in block 804. As an example of selecting the responder receiver based on a location of the fiber-shaped device, the processor 502 can receive the location of the fiber-shaped device (e.g., as determined by the device 300 in block 708 of FIG. 7 and transmitted by the device 300 to the remote computer 309 in block 710 of FIG. 7), comparing the location of the fiber-shaped device with the location of each of a plurality of responder receivers using a traffic routing system (or other methods of mapping and routing), and select at least one of the responder receivers closest to the fiber-shaped device.

In block 812, the processor 502 can transmit the responder information prepared in block 808 to a responder receiver, such as the responder receiver selected in block 810. In some example implementations, the responder receiver can include a radio, a desktop computer, a laptop computer, a workstation, a mobile phone, a tablet computing device, a pager, and/or any communications device by which an emergency responder can receive a dispatch and/or information concerning an emergency. In some example implementations, the processor 502 can transmit the responder information via the communications interface 510 of the computer 500.

In block 814, the processor 502 can transmit the situational information retrieved in block 806 to the responder receiver, such as the responder receiver selected in block 810. In some example implementations, the processor 502 can transmit the situational information to the responder receiver via the communications interface 510 of the computer 500. In some example implementations, the situational information can be transmitted to the responder receiver together with or as part of the responder information transmitted in block 812.

In block 816, the processor 502 can transmit a distress signal receipt to the fiber-shaped device or to a receipt indicator. In some example implementations, the processor 502 can transmit the distress signal receipt via the communications interface 510 of the computer 500. In some example implementations, the receipt indicator can be analogous to the receipt indicator 112 described above with reference to FIG. 1. In some example implementations, the distress signal receipt transmitted by the processor 502 can cause the fiber-shaped device or the receipt indicator 112 to present a visual confirmation (e.g., a light, a readable display, and/or the like), an audible confirmation (e.g., a tone, a spoken message, and/or the like), and/or a tactile confirmation (e.g., a vibration).

The foregoing disclosure describes a discreet and wearable fiber-shaped device that can monitor for an emergency distress situation and transmit a distress signal with minimal interaction from the user, and a remote computer for responding to the distress signal transmitted by the fiber-shaped device. Accordingly, emergency responders can be notified early of an emergency situation. Additionally, by virtue of the discreet fiber shape of the device and the capability of the device to wireless transmit sensor signals and/or remotely control recorders, emergency responders can have access to real-time information from the scene of the emergency, even in the case where the user needs to remain concealed for safety.

In the foregoing description, numerous details are set forth to provide an understanding of the subject disclosed herein. However, implementation may be practiced without some or all of these details. Other implementations may include modifications and variations from the details discussed above. It is intended that the following claims cover such modifications and variations.

I claim:

1. A device comprising:
a substrate that is fiber-shaped;
a sensor;
an analysis module to determine if a sensor signal from the sensor includes a trigger signal; and
a wireless communication module to transmit a distress signal to a remote computer in response to the analysis module determining that the sensor signal includes the trigger signal,
wherein at least one of the sensor, the analysis module, and the wireless communication module is embedded in the substrate during a three-dimensional (3-D) printing process.

2. The device of claim 1, wherein
the sensor is an audio sensor,
the trigger signal is a sound pattern recognizable by the analysis module, and
the distress signal includes a component selected from a list consisting of the trigger signal, a predetermined distress signal, a user identification, a user medical history, a live stream from the sensor, and a recording from the sensor.

3. The device of claim 1, further comprising a geolocation module that determines location information.

4. The device of claim 1, further comprising a remote control module to remotely control a recorder.

5. The device of claim 1, wherein the substrate includes a 3-D printed lipid bilayer.

6. A method comprising:
receiving a sensor signal from a sensor;
determining, by an analysis module, if the sensor signal includes a trigger signal; and
transmitting a distress signal from a wireless communication module to a remote computer in response to determining that the sensor signal includes the trigger signal,
wherein the sensor, the analysis module, and the wireless communication module are embedded in a fiber-shaped device during a three-dimensional (3-D) printing process.

7. The method of claim 6, wherein
the sensor is an audio sensor,
the trigger signal is a sound pattern recognizable by the analysis module, and
the distress signal includes a component selected from a list consisting of the trigger signal, a predetermined distress signal, a user identification, a user medical history stored in the analysis module, a live stream from the sensor, and a recording from the sensor.

8. The method of claim 6, comprising
determining location information using a geolocation module embedded in the device; and
transmitting the location information to the remote computer.

9. The method of claim 6, comprising controlling a recorder by a remote control module, wherein the remote control module is embedded in the device.

10. The method of claim 6, wherein the device includes a 3-D printed lipid bilayer, and at least one of the sensor, the analysis module, and the wireless communication module is embedded in the device.

11. A non-transitory machine-readable medium storing instructions that, when executed by a processor, cause the processor to:
receive a distress signal sent by a fiber-shaped device upon the device determining that a sensor embedded in the device received a trigger signal, the fiber-shaped device including at least one of the sensor, an analysis module, and a wireless communication module that is embedded in the fiber-shaped device during a three-dimensional (3-D) printing process;
prepare responder information after receiving the distress signal; and
transmit the responder information to a responder receiver.

12. The non-transitory machine-readable medium of claim 11, further comprising instructions to analyze the distress signal to determine a distress type, wherein the instructions to prepare the responder information are performed in accordance with the distress type determined by the instructions to analyze.

13. The non-transitory machine-readable medium of claim 11, further comprising instructions to:
retrieve situational information from a data storage; and
transmit the situational information to the responder receiver.

14. The non-transitory machine-readable medium of claim 12, further comprising instructions to select the responder receiver based on at least one of the distress type and a nearness of the responder receiver to a location of the device determined by a geolocation module embedded in the device, wherein     the responder information includes a component selected from the list consisting of the distress signal, the distress type, a user identification, a user medical history, a sensor signal of the device, information received from a recorder controlled remotely by the device, and a user location.

15. The non-transitory machine-readable medium of claim 11, further comprising instructions to transmit a distress signal receipt from a remote computer to the device or to a receipt indicator.

\* \* \* \* \*